(12) United States Patent
Hidalgo et al.

(10) Patent No.: US 8,133,944 B2
(45) Date of Patent: Mar. 13, 2012

(54) USE OF GRAFTED SMA COPOLYMERS IN LIQUID COMPOSITIONS

(75) Inventors: Manuel Hidalgo, Brignais (FR); Sandra Grimaldi, Saint-Foy-les-Lyons (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/667,256

(22) PCT Filed: Jun. 23, 2008

(86) PCT No.: PCT/FR2008/051121
§ 371 (c)(1),
(2), (4) Date: Jun. 10, 2010

(87) PCT Pub. No.: WO2009/004264
PCT Pub. Date: Jan. 8, 2009

(65) Prior Publication Data
US 2010/0249281 A1    Sep. 30, 2010

(30) Foreign Application Priority Data
Jul. 2, 2007   (FR) ...................................... 07 56223

(51) Int. Cl.
*C08K 5/3445* (2006.01)
*C08K 3/00* (2006.01)

(52) U.S. Cl. .......................................... 524/106; 524/5

(58) Field of Classification Search ................... 524/106
See application file for complete search history.

(56) References Cited

U.S. PATENT DOCUMENTS

| | | | |
|---|---|---|---|
| 2,971,939 A | 2/1961 | Baer | |
| 2,980,652 A * | 4/1961 | Melamed et al. | 526/262 |
| 3,363,029 A | 1/1968 | Verdol et al. | |
| 3,444,151 A * | 5/1969 | Gonzalez et al. | 526/203 |
| 3,732,334 A | 5/1973 | Koch | |
| 4,381,367 A | 4/1983 | von Bonin | |
| 4,831,367 A | 5/1989 | Baus | |
| 4,868,259 A | 9/1989 | Burroway | |
| 5,115,018 A | 5/1992 | Akkapeddi et al. | |
| 5,270,399 A * | 12/1993 | Czornij et al. | 525/327.6 |
| 5,290,849 A | 3/1994 | Lee | |
| 5,650,263 A | 7/1997 | Wakata | |
| 5,659,348 A * | 8/1997 | Malhotra | 347/105 |
| 6,063,184 A * | 5/2000 | Leikauf et al. | 106/802 |
| 2002/0069989 A1 | 6/2002 | Feret et al. | |
| 2004/0024127 A1 | 2/2004 | Baumert | |
| 2004/0054037 A1 * | 3/2004 | Abbeele van den et al. | 524/47 |
| 2007/0117909 A1 | 5/2007 | Seliskar | |
| 2008/0220271 A1 | 9/2008 | Baumert | |

FOREIGN PATENT DOCUMENTS

| | | |
|---|---|---|
| EP | 0393899 A | 10/1990 |
| EP | 0412832 A | 2/1991 |
| EP | 0810323 A2 | 12/1997 |
| EP | 1342764 A2 | 9/2003 |
| GB | 1053791 A | 1/1967 |
| WO | 0248459 A2 | 6/2002 |
| WO | 2006056690 A | 6/2006 |
| WO | 2006085007 A1 | 8/2006 |

OTHER PUBLICATIONS

International Search Report issued in PCT/FR2008/051121 filed Jun. 23, 2008, mailed Nov. 27, 2008.
Translation of the Written Opinion of the International Searching Authority issued for PCT/FR2008/051121, on Feb. 16, 2010.

* cited by examiner

*Primary Examiner* — Ling Choi
*Assistant Examiner* — Hui Chin
(74) *Attorney, Agent, or Firm* — Thomas F. Roland

(57) ABSTRACT

The invention includes a grafted copolymer derived from the grafting: of an SMA copolymer (II) derived from the copolymerization of at least two monomers, (i) the first monomer chosen from styrene and its derivatives and (ii) the second monomer including at least one anhydride functional group, with molecules belonging to the family of triazoles; used as the majority composition or additive of liquid compositions intended to be applied in or on sheets of paper or cardboard, onto hard surfaces, on leather or on textiles.

13 Claims, No Drawings

USE OF GRAFTED SMA COPOLYMERS IN LIQUID COMPOSITIONS

The present invention relates to the field of polymer additives based on styrene and anhydride units, constituted of macromolecular chains grafted by molecules of nitrogen-containing heterocycle type. In particular, it also, relates to the compositions comprising such additives and also to the uses thereof in particular in the field of the papermaking industry. The polymers comprising units derived from styrene or from a styrene derivative and units derived from an anhydride, in particular maleic anhydride are known as SMAs.

The use of SMA copolymers is well known in the manufacture of paper.

Indeed, polymer additives based on styrene and anhydride units make it possible to improve the properties of the paper such as its hydrophobicity, its water resistance, its printability and its surface appearance. These additives are often used as ingredients in liquid compositions for sizing or coating paper, the rheology of which they may also favorably modify by helping to reduce the viscosity, especially at high shear or by helping to increase the concentration of fillers or of pigments. These liquid compositions used for treating paper during its manufacture are aqueous suspensions of fillers or pigments which may also contain a binder and other additives.

Application WO 02/48459 cites polymers derived from the polymerization of styrene and of maleic anhydride that are incorporated into the formulation of compositions used for coating paper in high-speed processes.

However, the copolymers based on styrene and anhydride units do not make it possible to respond to certain problems encountered in the manufacture of paper in particular.

The Applicant has now found that the grafting of polymers based on styrene and anhydride units by molecules comprising nitrogen-containing heterocycles such as, for example, UDETA makes it possible to adjust the hydrophilic-hydrophobic balance of the copolymer making it possible, for example, to better dissolve styrene-rich copolymers, which is expressed by an improvement of the hydrophobicity properties of the treated paper. Furthermore, the grafting with molecules comprising nitrogen-containing heterocycles such as UDETA provides better compatibility with cellulose fibers and favors the dispersion of pigments and/or of fillers in liquid compositions used for the manufacture of paper. Similarly, in the other applications according to the invention, better surfactants and dispersants may be obtained by virtue of the grafting of molecules such as UDETA to copolymers based on styrene and anhydride units.

The polymer additive according to the invention is a graft copolymer derived from the grafting:
- of an SMA copolymer (II) derived from the copolymerization of at least two monomers, (i) the first monomer being chosen from styrene and derivatives thereof and (ii) the second monomer comprising at least one anhydride functional group;
- with either (iii) M—R—X molecules (I) comprising at least one unit (M) chosen from the units (1) to (4):

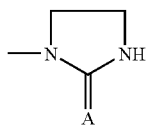

(1)

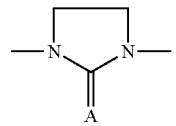

(2)

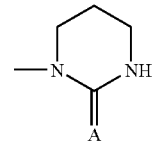

(3)

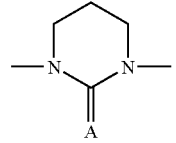

(4)

with A=oxygen, sulfur or NH;
and comprising at least one chemical functional group (X) chosen from a halogen, a primary or secondary amine functional group, an alcohol functional group, a thiol functional group, a carboxylic acid functional group or a derivative of this functional group and an epoxy functional group, the unit (M) and said functional group (X) being joined by a rigid or flexible chain (R);
or (iv) molecules belonging to the family of triazoles.

In the case of the SMA copolymer (II), units derived from other monomers may also be present without this excluding these polymers from the SMA designation. SMA copolymers may also be joined by covalent bonding to other polymers, especially to elastomeric polymers which may be chemically bonded to the SMAs. Since the anhydride units have a reactive or functional site of the copolymer remaining, they may be involved in a chemical reaction with other types of molecules.

When the anhydride groups will have participated in any modification reaction involving the opening of the anhydride groups, the resulting product is called a modified SMA or a functionalization derivative of SMA. It also appears pertinent to specify that, during the dissolution in aqueous media of an SMA copolymer, the addition of a mineral or organic base, usually an amine for the latter, is common practice. In this case, the anhydride groups may open and form carboxylic acid salts with the organic or mineral base. This salification leads to or favors the solubilization of the SMA copolymer. The modification of the SMA copolymers (II) by grafting of the molecules (I) according to the invention does not correspond simply to an acid-base salification reaction, but rather to a true chemical grafting of the molecules (I) to the copolymer (II) which is carried out prior to the use of the modified SMA additive, in a separate grafting step carried out in solution in a suitable solvent with subsequent separation of the graft copolymer or in the melt state, with no solvent, and such that it can be carried out in equipment for converting thermoplastic polymers, well known to a person skilled in the art, such as extruders, calandering machines and other mixers.

The SMA copolymer (II) is derived from the copolymerization of at least two different monomers, namely a styrene monomer, preferably styrene, and a monomer comprising an anhydride functional group, preferably maleic anhydride. The SMA copolymers may also be derived from copolymerizations with one or more other supplementary monomers such as, for example, acrylic comonomers such as alkyl (meth)acrylates. The SMA copolymers may also be joined, by chemical bonding, to other polymers, especially to elastomeric polymers.

The SMA copolymer (II) is derived from the copolymerization of a mixture of monomers comprising between 0.5 and 65% of monomers comprising an anhydride functional group (% by weight relative to the total mixture of monomers).

The molecular weights of the SMA copolymer according to the invention may vary between 500 and 500 000 daltons for the number-average molecular weight, $M_n$. Preferably, the SMA copolymers of use for the invention have number-average molecular weights between 2000 and 100 000 daltons.

The ratio of styrene units to anhydride units may vary between 0.6 to 1 and 29 to 1 and preferably between 1 to 1 and 6 to 1.

The M-R—X molecule (I) is derived from the reaction of urea with at least one compound chosen from alkyleneamines, amines, amino alcohols and amides. Advantageously, said compound comprises at least one primary amine functional group (—$NH_2$) and at least one secondary amine functional group (—NH—), said functional groups being joined by a carbon-based chain comprising at least 2 carbon atoms. The rigid or flexible chain (R) is a hydrocarbon-based chain which may bear one or more heteroelements. It could be a linear or branched hydrocarbon-based chain composed of one to 30 carbon atoms, a ring or a succession of alkyl or aryl elements, joined by —C(O)O—, OC(O), C(O), —O—, —S—, —NH— bridges.

Mention may be made, for example, of:

the UTETA molecule: 1-(2-[(2-aminoethyl)amino]-ethyl) imidazolidin-2-one derived from the reaction of urea with triethylenetetramine (TETA);

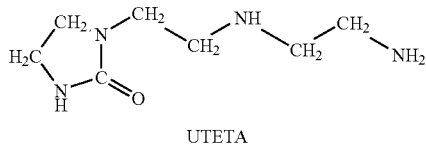

UTETA the UTEPA molecule: 1-(2-{2-[(2-amino-ethylamino] ethyl}amino)ethyl]imidazolidin-2-one derived from the reaction of urea with tetraethylenepentamine (TEPA)

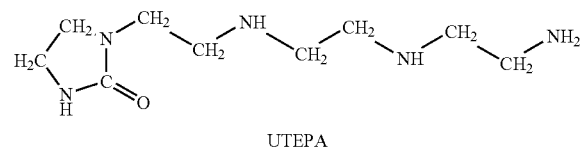

UTEPA the UDETA molecule: 2-aminoethylimidazolidinone or 1-(2-aminoethyl)imidazolidin-2-one derived from the reaction of urea with diethylenetriamine (DETA);

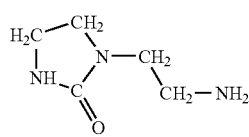

1-(2-aminoethyl)imidazolidin-2-one the UDETA molecule (formula below): 2-aminoethylimidazolidinone or 1-(2-aminoethyl)-imidazolidin-2-one derived from the reaction of urea with diethylenetriamine (DETA).

Advantageously, the functional group (X) of the molecule (I) is a primary or secondary amine functional group.

Advantageously, the unit (M) of the molecule (I) is the unit (1) which is a heterocycle of imidazolidone type with A=oxygen.

Advantageously, the molecule (I) is 1-(2-aminoethyl)-imidazolidin-2-one or UDETA:

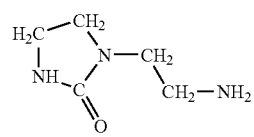

1-(2-aminoethyl)imidazolidin-2-one or UDETA

Regarding the molecules from the family of triazoles, mention may be made of:

4-amino-1,2,4-triazole

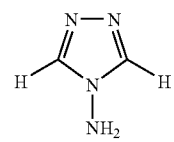

3-amino-1,2,4-triazole

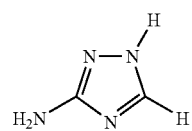

The reaction between the molecules (I) and the copolymer (II) may be carried out in solution or in the melt state. The molecules (I) and the copolymer (II) may be put into solution in a suitable solvent, such as chloroform, by choosing the reaction temperature so that the reaction takes place over a reasonable time ranging from a few minutes to a few hours. Or else, the molecules (I) may be brought into contact with the copolymer (II) in the melt state, with no solvent, such that this can be carried out in equipment for converting thermoplastic polymers, well known to a person skilled in the art, such as extruders, calandering machines and other mixers.

Regarding the uses of the modified SMA polymers according to the invention, mention may be made of the following uses:

as an additive in the field of the manufacture of paper. The additive is an ingredient of liquid compositions applied in or on the paper. These compositions may be used in the sizing or coating of paper. They may also be used within the context of paper finishing processes, for example for covering the sheets of paper with a view to facilitating subsequent printing on the paper. This additive thus improves the characteristics of the coated paper in terms of printability, color rendering, resolution, mechanical strength and feel. An advantageous compromise between the strength and the flexibility of the coated paper which is coated with a coating to which the additive according to the invention has been added and a good adhesion of one or more coating layers to the paper are obtained. Furthermore, by virtue of this additive, a better printing resolution is obtained. It also gives the paper a resistance, in particular to water (for making the paper hydrophobic), to greases or to other substances. It improves the retention of water in the paper (water/binder and fillers or pigments compatibility);

as the predominant compound or as an additive for the production of liquid coatings or compositions that can be applied to surfaces such as floors, in particular to tiled or parquet floors in order to give them a shiny and new appearance. These coatings have a good adhesion to their support and a good mechanical strength which constitutes an advantage on stressed supports such as floors for example;

as a surfactant, in particular for the stabilization of polymerizations in a dispersed medium such as direct and inverse (conventional, mini-emulsion, micro-emulsion) emulsion polymerization, direct and inverse suspension polymerization and dispersion or precipitation polymerization. See chapter 7 of the book "Les latex synthétiques. Elaboration-Propriétés-Applications [Synthetic latices. Development-Properties-Applications] compiled by Jean-Claude Daniel and Christian Pichot, published by Tec&Doc Lavoisier, 2006, ISBN 2-7430-0741-9 for a description of the various types of polymerizations in a dispersed medium;

as a co-surfactant: —for manufacturing aqueous compositions of inks, of paints or of varnish during the synthesis of acrylic binders by emulsion polymerization that can be used:

for manufacturing binders or coatings for leather or woven or nonwoven textiles;

as a dispersant of mineral or organic pigments especially in ink compositions. It furthermore facilitates the milling of pigments;

as a dispersant of mineral fillers such as calcium carbonate, kaolin, titanium dioxide or cement, in compositions such as grouts, mortars, concretes, paints and varnishes. It may also be a dispersant in another type of coatings (coating for sheets of paper for example); and as the predominant compound or an additive of liquid compositions intended to be applied in or on sheets of paper or cardboard, on hard surfaces, on leather or on textiles.

Preferably, the sheets of paper are sheets of printing/writing paper or of wrapping paper, in particular of wrapping paper produced from deinked mechanical paper pulp or from recycled paper pulp.

Preferably, the hard surfaces are chose from floors, walls and ceilings.

The following examples illustrate the invention, without limiting the scope thereof.

EXAMPLE 1

Grafting of an SMA Copolymer in an Extruder with UDETA

The SMA copolymer before grafting is an Aldrich® product containing 14% by weight of maleic anhydride. Its number-average molecular weight, $M_n$, is 85 000 g/mol and its weight-average molecular weight, $M_w$, is 188 000 g/mol. The grafting is carried out in a DSM Micro 15 Compounder micro-extruder under a stream of nitrogen. The SMA is first treated at 120° C. for 12 hours in a vacuum oven so as to reform the anhydrides capable of being hydrolyzed. 12 g of SMA are then mixed with 400 mg of UDETA having a molar purity greater than 85%. The extrusion temperature is 220° C. for screws rotating at 50 rpm. The material retains a good processability.

Thermal Analysis:

Samples of grafted SMA and non-grafted SMA of 10 mg each are analyzed by calorimetry using a DSC TA Q1000 machine operating in T4 mode. The glass transition temperatures of these two materials are estimated with heating and cooling rates of 10° C./min. The grafted SMA has a glass transition temperature of 5.4° C. higher than the non-grafted SMA (respectively 135.5° C. and 130.1° C.).

EXAMPLE 2

Grafting of an SMA Copolymer in an Extruder with a Smaller Amount of UDETA

The SMA copolymer before grafting is the same as that from example 1. The grafting is carried out in a DSM Micro 15 Compounder micro-extruder under a stream of nitrogen. The SMA is first treated at 120° C. for 12 hours in a vacuum oven so as to reform the anhydrides capable of being hydrolyzed. 12 g of SMA are then mixed with 170 mg of UDETA having a molar purity greater than 85%. The extrusion temperature is 220° C. for screws rotating at 50 rpm. The material retains a good processability.

Thermal Analysis:

Samples of grafted SMA and non-grafted SMA of 10 mg each are analyzed by calorimetry using a DSC TA Q1000 machine operating in T4 mode. The glass transition temperatures of these two materials are estimated with heating and cooling rates of 10° C./min. The grafted SMA has a glass transition temperature of 2.7° C. higher than the non-grafted SMA (respectively 132.7° C. and 130.1° C.).

EXAMPLE 3

Hydrophobizing Effect on Paper

The polymers from examples 1 and 2 are put into aqueous dispersion at 5% by weight in demineralized water with stirring. The polymer dispersion is mixed with a 33° SR pulp of refined paper fibers and with a cationic polymer agent (known as a retention agent) used for the manufacture, in a sheet machine, of sheets of paper, polyDADMAC (polydiallyldimethylammonium chloride) in an amount of 0.3% by weight relative to the fibers. The amount of grafted polymer dispersion according to the invention is adjusted so that the amount of polymer is of the order of 5% relative to the fibers. The suspension is then passed through a laboratory sheet machine in order to obtain sheets of paper of 60 to 70 g/m² having a thickness of 80 to 100 microns. As a reference, sheets that do not contain the polymers from example 1 and 2, but that contain polyDADMAC, are manufactured.

The hydrophobicity of the paper thus manufactured is obtained from a COBB test, well known to a person skilled in the art and which is carried out according to the standard NF EN 20535-ISO 535; the comparative results between the reference sheets of paper and those containing the graft polymer according to the invention are shown in table 1:

| COBB value (g/m²) | |
| --- | --- |
| Reference pulp | 160 |
| with ex. 1 polymer | 100 |
| with ex. 2 polymer | 80 |

The hydrophobizing effect of the polymer is expressed by a reduction in the COBB value.

EXAMPLE 4

Grafting of a Low Molecular Weight SMA Copolymer and Surfactant Properties of the Resulting Polymer The SMA copolymer before grafting is a Sartomer SMA 1000 product comprising a ratio of styrene:maleic anhydride units of 1:1. Granules of SMA 1000 are ground in a mortar or in a mill in order to have a fine powder which is then treated at 120° C. for 12 hours in a vacuum oven so as to reform the anhydrides capable of being hydrolyzed. 12 g of this powder are mixed with 170 mg of UDETA having a molar purity greater than 85% in a DSM Micro 15 Compounder microextruder under a stream of nitrogen. The extrusion is carried out at 220° C. and 50 rpm. The material is very fluid.

For the purpose of determining the surfactant properties of dilute aqueous solutions of the graft copolymer from example 1, an aqueous solution in demineralized water is prepared containing 1% by weight of this graft copolymer. This solution is filtered with a 0.8 micron filter. Next, solutions at 0.1%, 0.05%, 0.01% and 0.001% by weight are prepared by successive dilution of the filtered 1% solution. The surface tensions of these solutions are measured using a Tracker® brand drop tensiometer machine, controlled by Windrop® software with a needle having a diameter of 20 microns. Table 2 presents the result of the measurements taken.

TABLE 2

| | Conc (%) | | | | |
| --- | --- | --- | --- | --- | --- |
| | 0.0010 | 0.010 | 0.045 | 0.10 | 1.0 |
| Tension (mN/m) | 69 | 69 | 67 | 58 | 45 |

It emerges from this table that the graft copolymer from example 1 has surfactant properties associated with an amphiphilic character. It may therefore be used for giving a certain hydrophobicity to sheets of paper or of cardboard while making it possible, by virtue of its hydrophilic part, to thoroughly disperse the fillers and pigments, while having a good affinity with the (hydrophilic) cellulose fibers constituting the paper.

The invention claimed is:

1. A liquid composition for use in or on a substrate comprising
   a graft copolymer derived from the grafting:
   of a copolymer (II) derived from the copolymerization of at least two monomers, (i) the first monomer being chosen from styrene and derivatives thereof and (ii) the second monomer comprising at least one anhydride functional group;
   with
   molecules belonging to the family of triazoles;
   wherein said substrate is selected from the group consisting of paper, cardboard, hard surfaces, leather and textiles.

2. The liquid composition as claimed in claim 1, wherein the sheets of paper are sheets selected from the group consisting of printing/writing paper, wrapping paper, wrapping paper produced from deinked mechanical paper pulp, and wrapping paper produced from recycled paper pulp.

3. The liquid composition as claimed in claim 1, wherein the hard surfaces are chosen from floors, walls and ceilings.

4. The liquid composition as claimed in claim 1, wherein said liquid composition is an aqueous liquid compositions of inks, of paints or of varnishes.

5. The liquid composition as claimed in claim 4, wherein said graft copolymer is a surfactant or a co-surfactant.

6. The liquid composition as claimed in claim 4, wherein said graft copolymer is a dispersant of mineral or organic pigments and/or of mineral fillers.

7. The liquid composition as claimed in claim 6, wherein said graft copolymer is a mineral filler dispersant wherein said mineral filler is chosen from calcium carbonate, kaolin, titanium dioxide and cement.

8. The liquid composition as claimed in claim 6, wherein said liquid composition comprises grouts, mortars or concretes.

9. The liquid composition as claimed in claim 1, wherein the copolymer (II) is derived from the copolymerization of a mixture of monomers comprising between 0.5 and 65% by weight of monomers comprising an anhydride functional group, % by weight relative to the total mixture of monomers.

10. The liquid composition as claimed in claim 1, wherein the number-average molecular weight ($M_n$) of the copolymer (II) is between 500 and 500,000 daltons.

11. The liquid composition as claimed in claim 1, wherein the monomer comprising an anhydride functional group is maleic anhydride.

12. The liquid composition as claimed in claim 1, wherein the family of triazoles is selected from the group consisting of -4-amino-1,2,4-triazole and 3-amino-1,2,4-triazole.

13. The liquid composition as claimed in claim 10, wherein the number-average molecular weight ($M_n$) of the copolymer (II) is between 2,000 and 100,000 daltons.

* * * * *